United States Patent [19]

Liu et al.

[11] Patent Number: 5,070,155
[45] Date of Patent: Dec. 3, 1991

[54] SEMI-AROMATIC COPOLYAMIDE OR COPOLYESTER-AMIDE PREPARED FROM ALIPHATIC POLYAMIDE

[75] Inventors: Ming-de Liu, Jinan-Shandong, China; Bruno Bresci, Livorno, Italy; Pier L. Magagnini, Riglione, Italy; Nicoletta Maurizi, Ancona, Italy; Ugo Pedretti, Milan, Italy; Arnaldo Roggero, San Donato Milanese, Italy

[73] Assignee: Eniricerche, S.p.A., Milan, Italy

[21] Appl. No.: 444,824

[22] Filed: Dec. 1, 1989

[30] Foreign Application Priority Data

Dec. 2, 1988 [IT] Italy ................................. 22831 A/88

[51] Int. Cl.$^5$ ............................................. C08G 69/48
[52] U.S. Cl. ..................................... 525/432; 525/425
[58] Field of Search ................................ 525/432, 425

[56] References Cited

U.S. PATENT DOCUMENTS 3,650,999  3/1972  Martins et al. ...................... 525/432
4,788,248 11/1988  Maresca et al. ..................... 525/432
4,788,249 11/1988  Maresca et al. ..................... 525/432

Primary Examiner—Harold D. Anderson

Attorney, Agent, or Firm—Hedman, Gibson, Costigan & Hoare

[57] ABSTRACT

Semi-aromatic copolyamides and copolyester-amides are obtained by placing an aliphatic polyamide into contact with an aromatic hydroxyacid or aminoacid, by operating at high temperature, under melting conditions, possibly in the presence of a catalyst, with a ratio of the monomer units of aliphatic polyamide to the mols of aromatic hydroxyacid or aminoacid comprised within the range of from 20:1 to 1:1.

The semiaromatic copolyamides and copolyester-amides so obtained can display a thermotropic liquid-crystal behaviour as a function of their content of aromatic units linked inside the molecular chain. Their elastic modulus results to be improved relatively to the alifatic polyamides used as the starting product, and the elongation at break results to be decreased.

Such semiaromatic polyamides and copolyester-amides can find application in the production of high-stiffness articles, by means of moulding or extrusion processes. They can also be used as blends with the usual thermoplastic polymers, in which they act as reinforcer or compatibilizer agents.

18 Claims, No Drawings

SEMI-AROMATIC COPOLYAMIDE OR COPOLYESTER-AMIDE PREPARED FROM ALIPHATIC POLYAMIDE

The present invention relates to semiaromatic copolyamides and copolyester-amides, to the process for producing them, and to their use. In particular, the present invention relates to the chemical modification of aliphatic polyamides by means of amide-amide or amide-ester exchange reactions, with difunctional, aromatic compounds, in order to yield semiaromatic copolyamides or copolyester-amides of random character with variable contents, within desired ranges, of aromatic units and showing, as a consequence thereof, variable characteristics ranging from those of the polyamides used as the starting polyamides up to those of thermotropic liquid-crystal liquid phases.

It is well-known that some polymers with an aromatic, or prevailingly aromatic, chain, are capable of originating, at higher temperatures than their melting temperatures, liquid-crystal mesophases characterized by a relatively low viscosity and a more or less high degree of order; both of these features are the result of the trend shown by rigid macromolecules to orientate themselves parallelly to one another, with a reduced rate of entanglements. The processing of said mesophases by injection or extrusion makes it possible products with a high orientation degree to be obtained, which are characterized by enhanced mechanical properties.

Unfortunately, inasmuch as the molecular stiffness also causes an increase in melting temperature of polymers, the practical probability that a polymer with an aromatic chain may be used as above said (a thermotropic liquid-crystal polymer) is limited to particular structures, for which the melting temperature is lower enough then the thermal breakdown temperature.

In case of polymers belonging to the families of polyester polymers, suitable structures can be accomplished without excessive difficulties by resorting to the introduction into the polymeric chain of units which in some way disturb the structural regularity of the same macromolecule, and consequently also the stability of the solid crystal phases. The use, besides the traditional aromatic units linked to each other at the para-position of the aromatic ring, of asymmetrical units (such as, e.g., benzene rings substituted in their meta-position, naphthalene ring structures banded in the 2- and the 6-positions, aromatic groups containing more or less cumbersome side substituents) and/or of flexible units (such as, e.g., aliphatic or cycloaliphatic groups), made it possible copolyesters to be obtained, which show a rather wide range of stability of the nematic mesophases, such to secure their processing ability. As regards this prior art, reference is made in particular to the description by G. W. Calundann and M. Jaffe in the Transactions of Robert A. Welch Conferences on Chemical Research, XXVI, Synthetic Polymers, 247 (1982).

As regards the aromatic polyamides, they show the advantageous feature, as compared to polyesters, that they can be dissolved in suitable solvents in order to generate lyotropic liquid-crystal mesophases which are suitable for being processed by means of such methods as wet-spinning. Polyamide fibres endowed with extremely high values of mechanical properties have been produced in this way, and have been adopted for a large number of applications at the industrial level. Reference is made, e.g., to the description by S. L. Kwolek, P. W. Morgan and J. R. Schaefgen, Encyclopaedia of Polymer Sci. and Techn., Vol. 9, I (1987).

However, said solvent processing techniques result to be rather difficulty, and expensive; moreover, they can only be applied in practice to fibre production. In case of aromatic polyamides, the stability of their crystal structures and, consequently, the melting point of these latter result in general to be higher than of the corresponding polyesters. Precisely owing to their high melting point, often higher than their temperature of beginning of thermal breakdown, the aromatic polyamides do not show a thermotropic behaviour and consequently cannot be processed in the molten state.

Also the introduction of asymmetrical structural units in the molecylar chain of the aromatic polyamides is not enough in order to suitably lower the melting temperature of said polyamides without destroying the anisotropy of their molten masses. So, e.g., an aromatic polyamide known under the trade name NOMEX(®) (a product by DuPont) is constituted by aromatic units all linked to each other at their meta-positions (poly-m-phenyleneisophthalamide), shows a melting point (371° C.) very close to its thermal decomposition temperature and originates an isotropic molten mass; also such a polyamide is spun from solutions in suitable solvents.

A certain concentration of amide units, usually of up to 20%, is tolerated in completely aromatic copolyester-amides without the thermotropic behaviour of these latter being jeopardized, in that the reduced formation of hydrogen bonds does not cause excessive increases in their melting point. Some thermotropic liquid-crystal copolyester-amides, produced by means of reactions of polycondensation by starting from suitable monomer mixtures are described in the relevant technical literature, see, e.g., G. W. Calundann et al., log.cit.

From technical literature also semi-aromatic polyamides and co-polyamies are known, which are obtained by means of the polycondensation of disamines and diacids and/or aminoacids of aromatic and aliphatic nature. Some of these products have found some commercial applications and offer the advantages, over aliphatic polyamides, of a higher resistance to high temperatures and of a higher elastic modulus. However, for them too, only the conventional techniques of solution processing have been applied.

The present Applicant found now that semi-aromatic copolyamides and copolyester-amides can be obtained by chemically modifying an aliphatic polyamide, by causing this latter to interact in the molten state with at least one difunctional aromatic monomer. The present Applicant found also that the semiaromatic copolyamides and copolyester-amides resulting from such a chemical modification can show characteristics ranging from the typical characteristics of the aliphatic polyamides up to the typical properties of the thermotropic, liquid-crystal polymers; and this, as a function of the amount of aromatic units entered in the aliphatic polyamide.

In accordance therewith, the present invention relates to a process for preparing semi-aromatic copolyamides or copolyester-amides, characterized in that (a) an aliphatic polyamide, (b) an aromatic aminoacid and/or an aromatic hydroxy-acid, (c) a stoichiometrically equivalent mixture of a diacid selected from the group consisting of the aliphatic diacids containing from 6 to 10 carbon atoms and terephthalic acid and 4,4'-dihydroxy-biphenyl,
are reacted with one another, possibly in the presence of a catalyst, by operating under melting conditions, with a maximum temperature of the order of 300° C., with a ratio of the (a) monomer units contained in the aliphatic polyamide to the mols of the (b) component comprised within the range of from 20:1 up to 1:1, and preferably comprised within the range of from 10:1 up to 1.5:1, and with a molar ratio of the (c) component to the (b) component comprised within the range of from 0:1 to 0.5:1.

The aliphatic polyamide useful for the intended purpose can be selected from the group consisting of the usual aliphatic polyamides available from the market, such as nylon-6. nylon-66, nylon-11, and so forth.

The preferred aromatic aminoacid is 4-amino-benzoic acid, and the preferred aromatic hydroxy-acid is 4-hydroxy-benzoic acid. These reactants can be used in their acylated form, generally with acetic acid, or they can be used in their free form. In this latter case, the aromatic aminoacid or the aromatic hydroxy-acid can be charged to the reaction vessel together with an acyl anhydride and preferably acetic anhydride, used in a slight excess over the content of amino-groups and of hydroxy-groups in the reactant mixture. By so doing, during the first steps of reaction the acylation takes place in situ of the groups which are capable of undergoing the acylation reaction. Acetic anhydride, when used in excess, performs also the task of removing any residual moisture traces.

The reaction can be carried out in the presence of a catalyst, such as sodium acetate or zinc acetate, and toluene-sulfonic acid, capable of increasing the velocity of the amide-amide and amide-ester exchange reactions. When used, the catalyst shall be used in amounts of a few mols per one thousand mols of the other reactants.

According to the process of the present invention, the hareinabove specified reactants are reacted under an inert and anhydrous blanketing atmosphere, at increasing temperatures comprised within the range of from the melting temperature (of about 210°–250° C.), up to a maximum temperature of the order of 300° C. and under pressures which are reduced during the end step of the reaction, e.g., down to values of the order of $10^{-4}$ $mm_{Hg}$.

The reaction can be caused to take place inside a reactor equipped with stirring means, with vacuum fitting and nitrogen inlet tubes, and provided with means for removing the volatile products which are released during the reaction.

After the addition of the solid reactants, the reactor vacuum fitting is connected with vacuum manigold, and the reactor is heated up to temperature of the order of 105° C. Heating is continued for 2-3 hours, with anhydrous nitrogen being intermittently fed to reactor interior, for the purpose of removing moisture, in particular moisture absorbed by (a) reactant. The acyl anhydride, when used, is charged under a nitrogen stream, and the reactor is heated until its content is completely molten (200°–250° C.), with careful stirring. The viscosity of the reaction mixture, initially high owing to the presence of (a) polymer, considerably decreases during the first time period of heating, of about 2 hours, owing to the reactions of acidolysis of polyamide owing to the action of (b) reactant and, when present, of (c) reactant. This first step of reaction proceeds under refluxing acetic acid—or under reflux of another carboxy acid—and the reflux rate is higher in case the (b) reactant is used in its free form, i.e., if acetic anhydride, or another acyl anhydride, is used. After a time of from 1 to 3 hours, a gradual reduction of pressure is started, and said pressure is decreased within a 2-4 hours time down to its end value of about $10^{-4}$ $mm_{Hg}$, and is then kept constant at this value for a further time of from 1 to 3 hours. During the time during which the reaction takes place under reduced pressure, a considerable amount of volatile compounds, and prevailingly of the carboxy acid, are developed and the viscosity of the reaction mixture, which had considerably decreased during the preceding stage of the reaction, starts to gradually increase again. According to the preselected value of the ratio of the reactants to one another, a clouding of the molten mass may also occur, with said molten mass turning into showing the typical appearance of the liquid-crystal mesophases. During the end step of heating at the highest temperatures, under the highest vacuum values, a further increase in viscosity is observed and vapours of substances are released which, at least partially, condense as solid substances on the colder walls of the reactor. The reaction is stopped by discontinuing the heating when the material reaches the desired viscosity values. The product is removed from the reactor while said product is still fluid and, after cooling, can be submitted to possible purification treatments, e.g., by extraction with ethyl alcohol.

The physical-chemical and structural characterization of the so-obtained semi-aromatic copolyamides and copolyester-amides is carried out by means of calorimetric, thermal-optical and diffractometric analysis. Also the mechanical characteristics under tensile stresses of the specimens are determined.

From a qualitative viewpoint, three polymer types can be distinguished, as a function of the mutual ratio of the reactants.

When the molar ratio of (a)/(b) is higher than about 4, and the molar ratio of (c)/(b) is of zero, or is close to zero, the polymers show a crystal phase which, on X-ray diffraction analysis, appears to be qualitatively similar to the crystal phase of the starting nylon and which melts originating an isotropic liquid phase, at temperatures which gradually decrease with decreasing values of (a)/(b) ratio. Simultaneously, a gradual increase in glass transition temperature (Tg) is observed. The mechanical characteristics of these materials show, as compared to the nylon used as the starting material, a strong reduction in elongation at break, which decreases down to values of 50-20% of the initial value, as a function of the value of the ratio of (a)/(b), and an increase, of up to about 25%, in elastic modulus. The ultimate tensile strength undergoes smaller changes.

When the molar ratio of (a)/(b) is comprised within the range of from about 4 to about 2, the crystal phase is practically absent in the polymers cooled at a normal cooling speed from the molten state. The powder diffraction spectrum of X rays, obtained by using the K-alpha radiation of Cu, shows a very broad, low-intensity peak, corresponding to a distance of 4.3–4.5 Å (0.43–0.45 nm).

At the calorimetric and thermal-optical analysis, the materials display a very similar behaviour to amorphous polymers, with the passage from the solid state to the liquid state being characterized by a change in specific heat, at most accompanied by a weak enthalpic effect.

The mechanical characteristics do not show any substantial changes relatively to those of previously described polymers, except for a further decrease in elongation at break values, which decrease down to values of 2–3%. These polymers show a marked adhesive power for the materials they are put into contact with, before they solidify by cooling.

When the molar ratio of (a)/(b) is comprised within the range of from 2 to 1, for any values of the molar ratio of (c)/(b), the polymers show a higher liquefaction temperature (120°–220° C.), which increases with decreasing values of (a)/(b) ratio; above such temperatures, the materials display the typical behaviour of nematic thermotropic liquid-crystal polymers, with a high birefringence when a thin film thereof is observed under a polarizer microscope, and X-ray diffraction spectra characterized by very broad peaks, more intense than typical peaks of isotropic polymers. At low temperatures, the mesophase tends to freeze yielding an anisotropic, solid, glass phase even if, in particular at lower values of (a)/(b) ratio, the diffractometric analysis shows the presence of a crystal phase, presumably originated by homopolymeric blocks of units derived from reactant (b). The mechanical characterization of these polymers shows a further increase in elastic modulus, up to values about 65% higher than of the nylon used as the starting material.

In order to supply a pictorial representation of what above stated about the technical and structural characteristics of the polymers according to the present invention, in FIG. 1 of the hereto attached drawing table, the state diagram is reported of the polymers obtained by using nylon-6 as the (a) reactant and 4-acetamido-benzoic acid as the (b) reactant. In such a diagram, the letter k indicates a crystal phase, the letter i indicates an isotropic phase, the letter g the glass phase and the letter m indicates a mesophase (of nematic type).

The lines indicated by Tm and Tg indicate the change in melting temperature of the crystal phase and in softening temperature of the glass phase, as a function of the composition. The mesophase m results to be stable up to the highest temperatures which can be reached during the course of the thermal-optical analyses (320° C.).

The polymers according to the present invention can be fabricated by means of the normal techniques of melt processing, such as moulding and extrusion. The copolyamides and copolyester-amides in which the ratio of the units derived from (a) reactant to the units derived from (b) reactant is comprised within the range of from about 2 to about 1, show a certain degree of molecular orientation in the articles manufactured by extrusion, or by injection-moulding. This is particularly true if the transformation is carried out with an elongational flow component, e.g., by stretching the molten polymer. The mechanical characteristics of the so-obtained polymers are in general better than of the polyamides used as the starting materials, in particular as regards their elastic modulus. For example, on the specimens obtained by injection-moulding, the values of elastic modulus determined for the products from the chemical modification of nylon-6 by means of the process according to the present invention, result to be of 1.45–1.87 GPa, vs. 1.22 GPa of analogous specimens of non-modified nylon-6, and this as a function of the content of aromatic units entered in the chain, as it can be also seen from the following experimental examples.

The polymers obtained by means of the process according to the present invention can be blended with the usual thermoplastic polymers available from the market, while these latter are being processes, in order to yield materials with improved mechanical properties.

The blending of the polymers according to the present invention with the aliphatic polyamides available from the market yields the best results, thanks to the high mutual affinity of the components contained in the blend. In particular the addition of rather low percentages (from 5 to 30% by weight) of the copolyamides or copolyester-amides according to the present invention to the traditional aliphatic polyamides can cause an increase of about 30% in elastic modulus. Such blends, with their thermal history being the same, also show a crystallinity degree which is often higher than of non-blended polyamides.

The following experimental examples are given for the purpose of better illustrating the present invention.

EXAMPLE 1

The following reactants:

| | |
|---|---|
| Nylon-6 (inherent viscosity in sulfuric acid, at 25° C. = 1.22 dl/g) | 170 g (1.5 mol) |
| p-Acetamido-benzoic acid | 27 g (0.15 mol) |
| Anhydrous sodium acetate | 49 mg (0.6 mmol) | are charged to a glass flask of 2 liters of capacity, equippes with stirring means with a stainless-steel anchor, revolving at the speed of 1–2 rpm, with a "Brignole" sealing, with a charging opening for charging the reactants and with a glass pipe for anhydrous nitrogen inlet and acting as a fitting for vacuum application by being connected with a vacuum line, with vacuum being generated by a mechanical/diffusion pump.

After sealing the reactor, vacuum is applied to it and the reactor is heated with an oil bath up to 105°–110° C. Anhydrous nitrogen is then introduced, and the reactor is evacuated again. This cycle is repeated a plurality of times, within a time of two hours, in order to remove any moisture contained inside the reaction medium. Then, nitrogen is fed again and, after replacing the oil bath with a molten-salts bath, temperature is increased up to 230° C. The molten mass is homogenized with stirring and the development increases of acetic acid, which refluxes, condensing on the cold walls in the top portion of the reactor. The temperature is gradually increased up to about 270° C. within a 1-hour time, with nitrogen pressure being kept slightly under atmospheric pressure. During this time period, the viscosity of the reaction mass shows a considerable decrease. The pressure inside the reaction vessel is then gradually lowered, with the evaporation being thus caused of acetic acid, which is condensed and collected inside a trap cooled with liquid nitrogen. As acetic acid is removed, the viscosity of the reaction mixture starts to gradually increase again. After about 1 hour, the development of vapour becomes very faint, and the pressure inside the reaction vessel is decreased down to the maximum vacuum value, of about $10^{-4}$ mm$_{Hg}$, with temperature being maintained at about 270° C. The polymer mass has now a very high viscosity, such that vapour bubbles can escape from it with difficulty. These conditions are maintained for a further hour. The molten-salts bath is then removed and, before the molten mass solidifies on cooling, nitrogen gas is fed again, the reactor is opened and the still molten product is removed by means of a steel spoon. The polymer is cooled with liquid nitrogen, and is ground in a hammer mill. The ground product is then washed with ethyl alcohol in order to eliminate moisture condensed on it due to low temperature, and the washed ground product is then extracted for two hours with anhydrous ethanol inside a Soxhlet extractor. The ground polymer is then dried inside a vacuum oven at 110° C.

At NMR analysis, a solution of the polymer in sulfuric acid shows that this latter has the chemical structure of a copolyamide containing an aminobenzoic unit per each 10 amidocaproic units, with a substantially random distribution. The inherent viscosity, as measured in sulfuric acid at 25° C., results to be of 0.95 dl/g. The calorimetric analysis shows an andothermic transition centered around 190° C., to be compared to the value of about 221° C. of the nylon-6 used as the starting material and with a melting enthalpy of 57.3 J/g, to be compared to the value of 56.5 J/g of the nylon-6 used as the starting material. The X-ray diffraction spectrum shows two very intense reflexes at 4.40 and 3.80 Å (the first of which is more intense and steep), corresponding to a crystal structure similar to alpha structure of nylon-6.

After a 20-hours ageing under vacuum, at a temperature of 185°–190° C., a slight increase is observed in the inherent viscosity of the material, which reaches the value of 1.06 dl/g, while melting temperature and melting enthalpy respectively increase up to 197° C. and 64 J/g. The melting peak, on the DSC chart, turns into much narrower and steeper.

The thermal-optical analysis shows that the material is practically isotropic above its melting temperature.

By means of an injection-moulding apparatus of laboratory size, specimens of copolyamide of 2 mm of diameter are prepared. These specimens are used in order to determine the stress-strain curves by means of a mini-tensile tester. The following values are obtained (as average values from 5 measurements):

| | |
|---|---|
| elastic modulus | 1.48 GPa |
| ultimate tensile strength | 92 MPa |
| elongation at break | 40% |

EXAMPLE 2

The same procedure as of Example 1 is repeated, with the following reactants being charged to the reactor:

| | |
|---|---|
| Nylon-6 | 90.4 g (0.8 mol) |
| 4-Acetoxy-benzoic acid | 36.0 g (0.2 mol) |
| 4-Acetamido-benzoic acid | 35.8 g (0.2 mol). |

The procedure disclosed in Example 1 is repeated, with the step of gradual reduction of pressure down to its minimum value of $10^{-4}$ mm$_{Hg}$ being prolonged (two hours instead of 1 hour).

The so-obtained polymer shows at the calorimetric analysis a weak exothermic transition around 160° C., at which temperature it turns from the solid state into the liquid state. The polymer is practically isotropic at the thermal-optical analysis, both above and under said temperature. The diffractometric analysis shows a single reflex, very broad and of low intensity, corresponding to a distance of 4.35–4.45 Å.

EXAMPLE 3

The following reactants:

| | |
|---|---|
| Nylon-6 | 67.8 g (0.6 mol) |
| p-Acetamido-benzoic acid | 35.7 g (0.3 mol) | are charged to the reactor.

The reaction mass is heated for 2 hours at 105°–110° C., with alternating application of vacuum and of anhydrous nitrogen, as disclosed in Example 1. Through the charging opening,

| | |
|---|---|
| Acetic anhydride | 33.0 g (0.32 mol) | is then charged under a nitrogen stream.

The process is then continued as disclosed in Example 1. During the step of gradual pressure decrease, the molten mass gradually loses its clearness, taking the typical appearance of the mesophases of the liquid crystals. The polymer is obtained with a practically quantitative yield, and has an inherent viscosity in sulfuric acid of 0.88 dl/g.

The DSC chart of the copolyamide shows a very weak and estremely broad endothermal peak 140° C. on the axis of temperatures around. At higher temperatures, the copolyamide is an anisotropic liquid bi-refringent under polarized light, and preserves these characteristics up to the highest temperature values which can be reached with the thermal-optical analysis (320° C.). The X-ray diffraction spectrum, at room temperature, shows a reflex corresponding to a distance of about 4.3 Å. At temperatures higher than about 200° C., the reflex, although broader and weaker, is still present.

The mechanical characteristics, measured on specimens as described in Example 1, are the following:

| | |
|---|---|
| elastic modulus | 1.82 GPa |
| ultimate tensile strength | 88 MPa |
| elongation at break | 3.4% |

EXAMPLE 4

The following reactants:

| | |
|---|---|
| Nylon-6,6 | 113 g (0.5 mol) |
| (inherent viscosity in sulfuric acid = 1.43 dl/g) | |
| 4-Acetoxy-benzoic acid | 54 g (0.3 mol) |
| 4,4'-Diacetoxy-biphenyl | 27 g (0.1 mol) |
| Terephthalic acid | 16.6 g (0.1 mol) | are charged to the reactor.

The process is carried out in the same way as of the preceding examples, with temperatures being used, which on the average are 20°–30° C. higher, and with the reaction mass being heated, during the end step of the reaction, up to 290° C. During this latter step, the deposition is observed of a thin film of a white solid on the cold walls of the reactor, slightly above the oil bath level.

At thermal-optical analysis, the polymer shows the typical behaviour of the nematic liquid crystals, up to the highest temperatures which can be reached. At low temperature, it turns into a solid phase constituted by an opaque, anisotropic glass.

EXAMPLE 5

The following reactants:

| | |
|---|---|
| Nylon-6 | 56.6 g (0.5 mol) |
| 4-Acetamido-benzoic acid | 89.5 g (0.5 mol) | are charged to the reactor.

The process is carried out in the same way as disclosed in Example 1, with the only exception that during the end step of the process temperature is increased up to 300° C. Towards the end of the reaction, the reaction mixture is strongly opaque, indicating the presence of a solid crystal phase dispersed through the viscous liquid.

At the calorimetric analysis, no transitions are evidenced throughout the explored temperature range (of from 40° to 320° C.). The thermal-optical analysis shows a softening around about 200°–230° C., above which the birefringence which can be observed under polarized light becomes more evident. The X-ray diffraction spectrum shows the presence of strong reflexes at distances of 4 35, 3.87 and 3.11 Å, to be attributed to the presence of crystal phases originated by homopolymeric sequences of amidobenzoic units.

The mechanical characteristics are difficult to be measured on specimens obtained by means of the injection-moulding of the polymer in the molten state, owing to their high brittleness.

EXAMPLE 6

The polymer as produced in Example 1 is mixed in the molten state at 240° C., for about 10 minutes, in a Brabender mixer, with Nylon-6 from the market, in the ratio of 30:70 by weight.

After cooling, the blend is ground in the presence of liquid nitrogen is dried at 120° C. for 24 hours, and is injection-moulded at 260° C. The obtained specimens are submitted to the tensile test and show the following values:

| | |
|---|---|
| elastic modulus (average value) | 1.57 GPa |
| ultimate tensile strength | 97 MPa |
| elongation at break | 60% |

The melting enthalpy of a sample of said blend is of 69.8 J/g, to be compared to the value of 56.5 J/g of a sample of nylon-6 which underwent the same thermal history.

EXAMPLE 7

The polymer as produced in Example 3 is blended with nylon-6 in the proportion of 10:90, as disclosed in Example 6. The mechanical characteristics of the blend are:

| | |
|---|---|
| elastic modulus | 1.62 GPa |
| ultimate tensile strength | 95 MPa |
| elongation at break | 3.9% |

We claim:

1. Process for preparing semi-aromatic copolyamides or copolyester-amides, wherein
   (a) an aliphatic polyamide;
   (b) an aromatic amino acid; with or without
   (c) a stoichiometrically equivalent mixture of a diacid selected from the group consisting of the aliphatic diacids containing from 6 to 10 carbon atoms, terephthalic acid, and 4,4'-dihydroxy-biphenyl;
are reacted in the presence or absence of a catalyst, under melting conditions, with a maximum temperature of the order of 300° C., with a ratio of the (a) monomer units contained in the aliphatic polyamide to the moles of the (b) component comprised within the range of from 20:1 up to 1:1, and with a molar ratio of the (c) component to the (b) component comprised within the range of from 0:1 to 0.5:1.

2. Process according to claim 1, wherein said molar ratio of (a) to (b) is comprised within the range of from 10:1 up to 1.5:1.

3. Process according to claim 1, wherein the aliphatic polyamide is selected from the group consisting of nylon-6, nylon-66, and nylon-11.

4. Process according to claim 1 wherein the aromatic amino acid is 4-amino-benzoic acid.

5. Process according to claim 1, wherein reaction is carried out at an intermittently increasing temperature comprised within the range of from the melting temperature up to about 300° C., and wherein pressure is reduced at least once during the reaction.

6. Semi-aromatic copolyamide or copolyester-amide obtained by the process according to claim 1.

7. Process for preparing semi-automatic copolyamides or copolyester-amides, wherein
   (a) an aliphatic polyamide;
   (b) an aromatic hydroxyacid; and optionally
   (c) a stoichiometrically equivalent mixture of a diacid selected from the group consisting of the aliphatic diacids containing from 6 to 10 carbon atoms, terephthalic acid, and 4,4'-dihydroxy-biphenyl;
are reacted in the presence or absence of a catalyst, under melting conditions, with a maximum temperature of the order of 300° C., with a ratio of the (a) monomer units contained in the aliphatic polyamide to the moles of the (b) component comprised within the range of from 20:1 up to 1:1, and with a molar ratio of the (c) component to the (b) component comprised within the range of from 0.1 to 0.5:1.

8. Process according to claim 7, wherein said molar ratio of (a) to (b) is comprised within the range of from 10:1 up to 1.5:1.

9. Process according to claim 7, wherein the aliphatic polyamide is selected from the group consisting of nylon-6, nylon-66, and nylon-11.

10. Process according to claim 7, wherein the aromatic hydroxy-acid is 4-hydroxy-benzoic acid.

11. Process according to claim 7, wherein reaction is carried out at an intermittently increasing temperature comprised within the range of from the melting temperature up to about 300° C., and wherein pressure is reduced at least once during the reaction.

12. Semi-aromatic copolyamide or copolyester-amide obtained by the process according to claim 7.

13. Process for preparing semi-aromatic copolyamides or copolyester-amides, wherein
   (a) an aliphatic polyamide;
   (b) a mixture of an aromatic amino acid and an aromatic hydroxyacid; with or without
   (c) a stoichiometrically equivalent mixture of a diacid selected from the group consisting of the aliphatic diacids containing from 6 to 10 carbon atoms, terephthalic acid, and 4,4'-dihydroxy-biphenyl;
are reacted in the presence or absence of a catalyst, under melting conditions, with a maximum temperature of the order of 300° C., with a ratio of the (a) monomer units contained in the aliphatic polyamide to the moles of the (b) component comprised within the range of from 20:1 up to 1:1, and with a molar ratio of the (c) component to the (b) component comprised within the range of from 0:1 to 0.5:1.

14. Process according to claim 13, wherein said molar ratio of (a) to (b) is comprised within the range of from 10:1 up to 1.5:1.

15. Process according to claim 13, wherein the aliphatic polyamide is selected from the group consisting of nylon-6, nylon-66, and nylon-11.

16. Process according to claim 13, wherein the aromatic amino acid is 4-amino-benzoic acid, and the aromatic hydroxy-acid is 4-hydroxy-benzoic acid.

17. Process according to claim 13, wherein reaction is carried out at an intermittently increasing temperature comprised within the range of from the melting temperature up to about 300° C., and wherein pressure is reduced at least once during the reaction.

18. Semi-aromatic copolyamide or copolyester-amide obtained by the process according to claim 13.

* * * * *